(12) United States Patent
Buess

(10) Patent No.: US 9,453,680 B2
(45) Date of Patent: Sep. 27, 2016

(54) INJECTOR DEVICE FOR BLOWING OXYGEN-RICH GASES ON OR IN, IN A METALLURGICAL UNIT OR MELTING VESSEL, AND ELECTRIC ARC FURNACE

(71) Applicant: SMS Group GmbH, Duesseldorf (DE)

(72) Inventor: Stefan Buess, Wuppertal (DE)

(73) Assignee: SMS GROUP GMBH, Duesseldorf (DE)

( * ) Notice: Subject to any disclaimer, the term of this patent is extended or adjusted under 35 U.S.C. 154(b) by 0 days.

(21) Appl. No.: 15/026,320

(22) PCT Filed: Sep. 10, 2014

(86) PCT No.: PCT/EP2014/069306
§ 371 (c)(1),
(2) Date: Mar. 31, 2016

(87) PCT Pub. No.: WO2015/051966
PCT Pub. Date: Apr. 16, 2015

(65) Prior Publication Data
US 2016/0238320 A1 Aug. 18, 2016

(30) Foreign Application Priority Data

Oct. 8, 2013 (DE) .................. 10 2013 220 228

(51) Int. Cl.
*F27D 3/16* (2006.01)
*C21C 5/52* (2006.01)
*F27B 3/08* (2006.01)
*F27B 3/22* (2006.01)
*F27D 99/00* (2010.01)

(52) U.S. Cl.
CPC .............. *F27D 3/16* (2013.01); *C21C 5/5217* (2013.01); *F27B 3/085* (2013.01); *F27B 3/225* (2013.01); *F27D 99/0001* (2013.01); *F27D 2003/164* (2013.01); *F27D 2003/165* (2013.01); *F27D 2003/169* (2013.01); *F27D 2099/0021* (2013.01); *F27D 2099/0055* (2013.01); *F27D 2099/0056* (2013.01)

(58) Field of Classification Search
CPC .......................... C21C 5/4606; C21C 5/5217
USPC .......................................................... 266/217
See application file for complete search history.

(56) References Cited

U.S. PATENT DOCUMENTS

| 4,653,730 A | 3/1987 | Wunsche |
| 5,599,375 A | 2/1997 | Gitman |

(Continued)

FOREIGN PATENT DOCUMENTS

| AU | 538402 | 8/1984 |
| WO | 2006105578 | 10/2006 |
| WO | 2012089754 | 7/2012 |

*Primary Examiner* — Scott Kastler
(74) *Attorney, Agent, or Firm* — Abelman, Frayne & Schwab

(57) ABSTRACT

The invention relates to an injector apparatus (1) for the pyrometallurgical treatment of metals, molten metals and/or slags in a metallurgical unit or melting vessel, said apparatus comprising an injector device (2, 3) for producing a high-velocity gas jet (5) from an oxygen gas jet (6) and an ignited combustible gas/air mixture jet (7), in which the injector device (2, 3) comprises a de Laval nozzle element (8) for producing the oxygen gas jet (6), said de Laval nozzle element being arranged in a nozzle head part (41), and in which the combustible gas/air mixture (7) can be mixed by means of a mixing element (9) for mixing combustible gas (32) and air (36), wherein the de Laval nozzle element (8) and the mixing element (9) are arranged jointly along the center longitudinal axis (13) of the injector device (2, 3), one behind the other, such that they can be detached from one another.

29 Claims, 7 Drawing Sheets

(56) References Cited

U.S. PATENT DOCUMENTS

Figure 1:
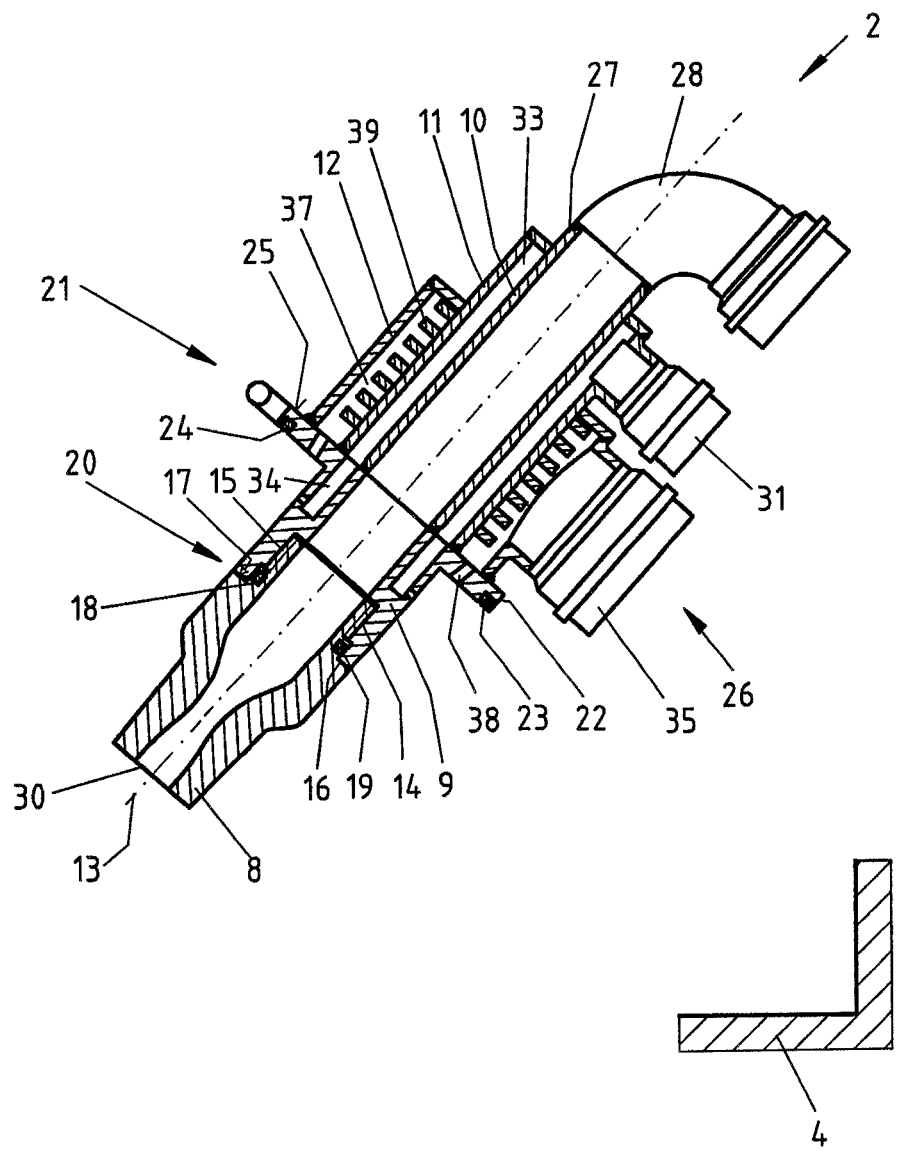

| | | |
|---|---|---|
| 6,142,765 A | 11/2000 | Ramaseder |
| 6,558,614 B1 | 5/2003 | Fritz |
| 7,258,831 B2 | 8/2007 | Vecchiet |
| 7,396,503 B2 | 7/2008 | Cameron |
| 7,591,876 B2 | 9/2009 | Cameron |
| 2008/0134838 A1* | 6/2008 | Memoli ................ C21C 5/5217 75/553 |
| 2013/0106034 A1* | 5/2013 | Odenthal ............... C21C 5/4606 266/99 |

\* cited by examiner

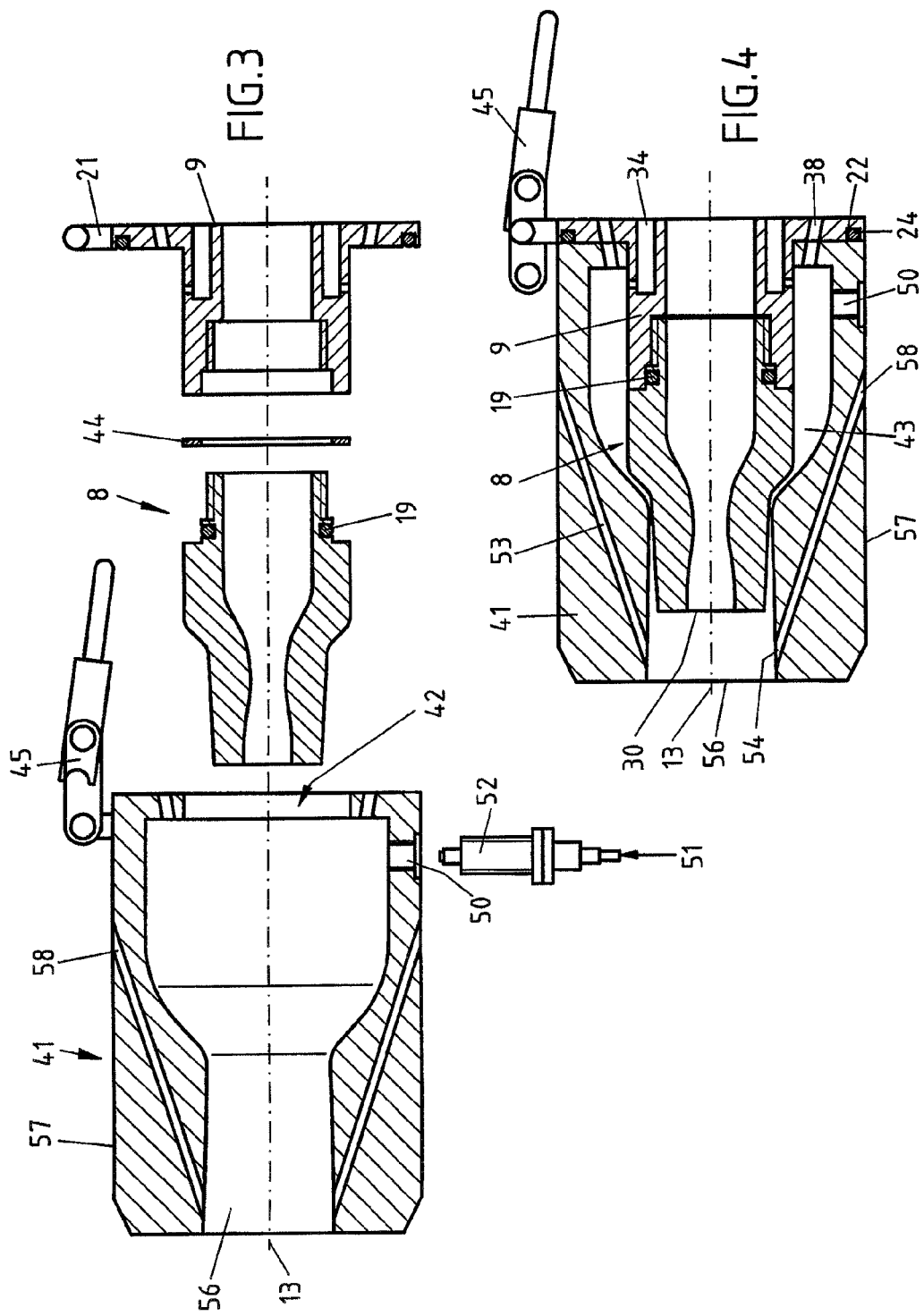

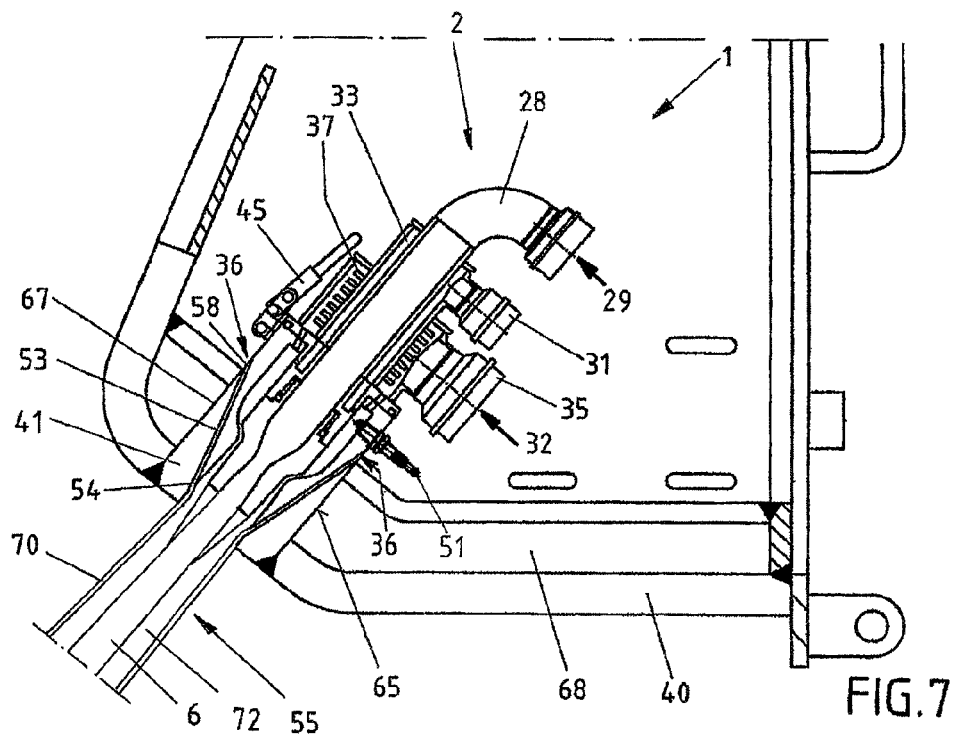
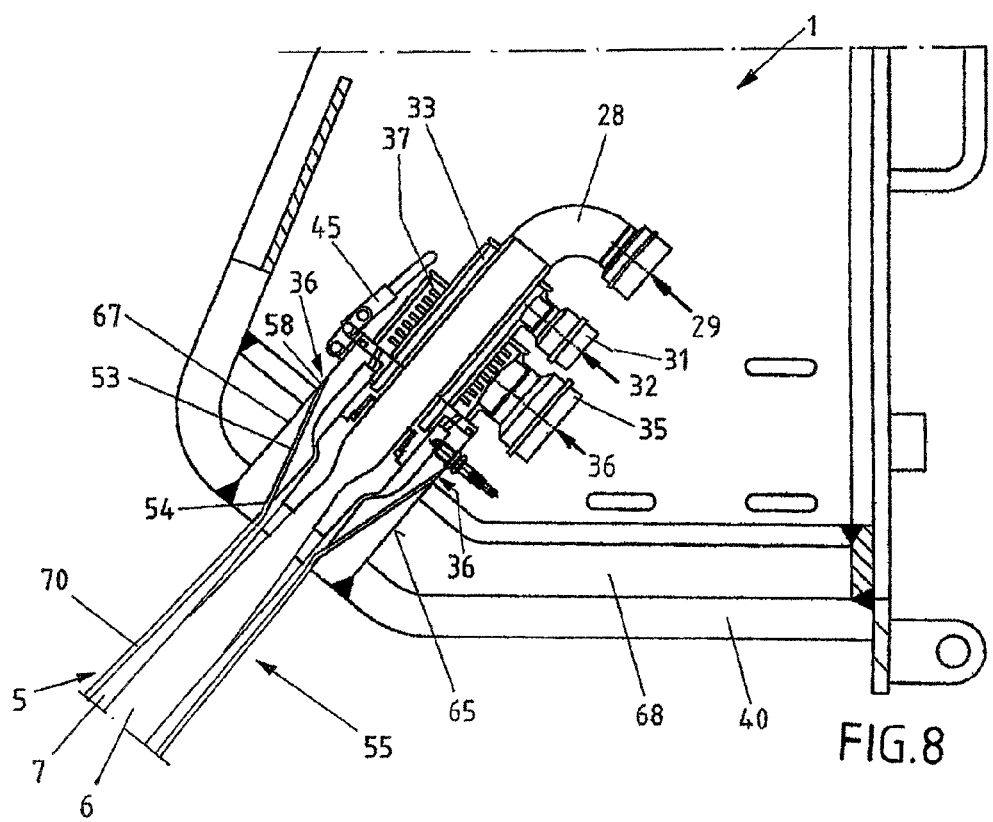

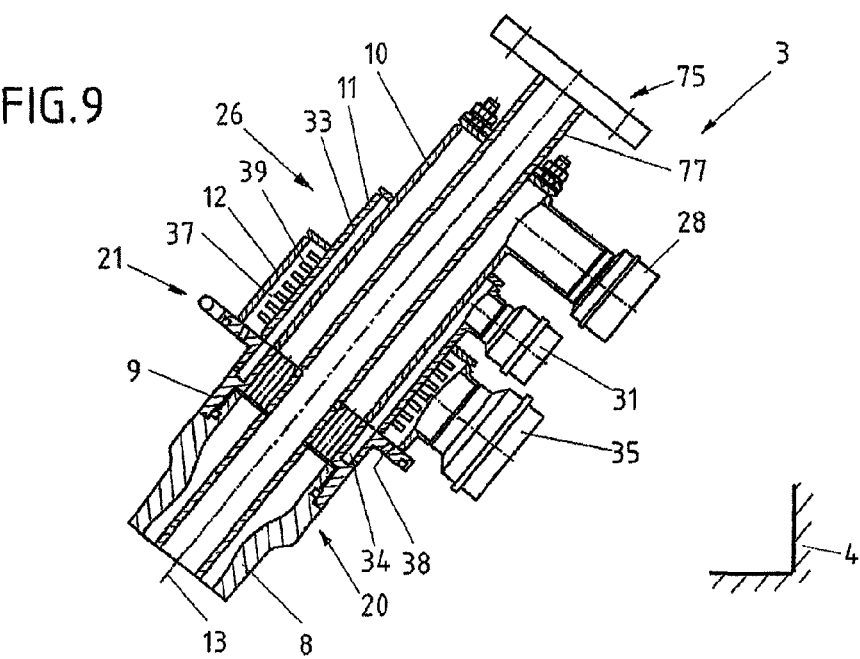
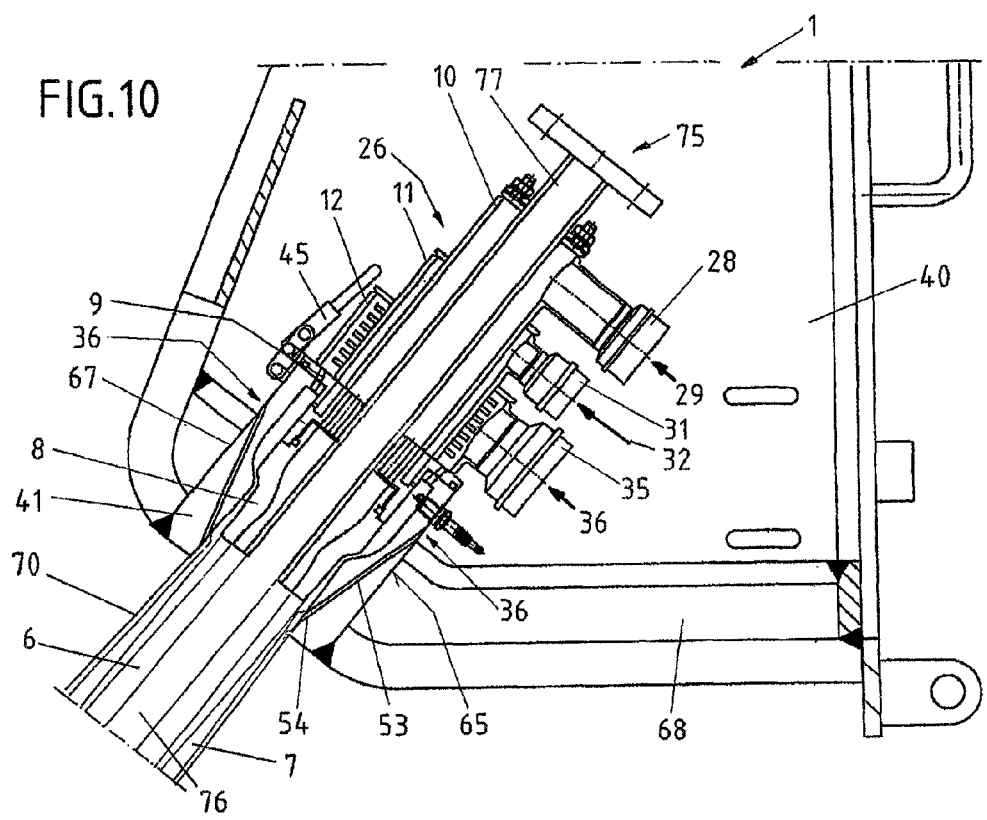

INJECTOR DEVICE FOR BLOWING OXYGEN-RICH GASES ON OR IN, IN A METALLURGICAL UNIT OR MELTING VESSEL, AND ELECTRIC ARC FURNACE

RELATED APPLICATIONS

The application is a National stage application of International application Serial No. PCT/EP2014/069306 filed Sep. 10, 2014 and which claims priority of German application DE 10 2013 220228.8 filed Oct. 8, 2013, both applications being incorporated herein by reference thereto.

The invention relates to an injector apparatus for the pyrometallurgical treatment of metals, molten metals and/or slags in a metallurgical unit or melting vessel, in particular an electric arc furnace, said apparatus having an injector device for producing a high-velocity gas jet from an oxygen gas jet and an ignited combustible gas/air mixture jet, in which the injector device comprises a de Laval nozzle element, arranged in a nozzle head part, for producing the oxygen gas jet, and in which the combustible gas/air mixture can be mixed by means of a mixing element for mixing combustible gas and air.

The invention further relates to an electric arc furnace.

Generic injector apparatuses and electric arc furnaces are well known in the prior art.

For example, the international application WO 2012/089754 A2 describes a method for the pyrometallurgical treatment of metals, molten metals and/or slags in a metallurgical unit or melting vessel, and a corresponding injector apparatus for carrying out the method. The injector apparatus is characterized particularly by an oxygen injector, to which a hot gas port with an igniting means is flange-connected, angled relative to the central axis of the oxygen connector. The igniting means, along with a mixer for mixing natural gas and air, is positioned at an end of the hot gas port that faces away from the oxygen injector. The mixer also supports the spark plugs for igniting the natural gas/air mixture. The ignited natural gas/air mixture is introduced laterally into the oxygen injector by means of the hot gas port, and the ignited natural gas/air mixture is accelerated through the oxygen gas jet flowing out of a de Laval nozzle of the oxygen injector. Although the pyrometallurgical treatment method can be carried out effectively using this injector apparatus, this injector apparatus is so large and costly that its manufacturing and maintenance are associated with disadvantages. In general, the individual components are also welded to one another. In other words, known injector apparatuses are solid, which is another factor that makes them costly to produce.

The object of the invention is to enhance generic injector apparatuses such that at least the aforementioned disadvantages are overcome.

The object of the invention is attained by an injector apparatus for the pyrometallurgical treatment of metals, molten metals and/or slags in a metallurgical unit or melting vessel, said apparatus having an injector device for producing a high-velocity gas jet from an oxygen gas jet and an ignited combustible gas/air mixture jet, in which the injector device comprises a de Laval nozzle element, disposed in a nozzle head part, for producing the oxygen gas jet, and in which the combustible gas/air mixture can be mixed by means of a mixing element for mixing combustible gas and air, the de Laval nozzle element and the mixing element being arranged, according to the invention, jointly along the center longitudinal axis of the injector device, one behind the other, in such a way that they can be detached from one another.

According to the invention, the de Laval nozzle element and the mixing element are arranged detachably from one another and one behind the other along the center longitudinal axis of the injector device of the injector apparatus, which is arranged in the metallurgical unit or melting vessel, thereby enabling the de Laval nozzle element in particular to be rapidly replaced. This is advantageous because the de Laval nozzle element is a wearing part. Moreover, the injector device can be easily adapted to different processes, as will be specified in greater detail in the following.

More particularly, the present injector device is exceptionally compact and small in design, allowing significant overall savings to be achieved in terms of the material that is used.

Heretofore, the de Laval nozzle element has been arranged along one longitudinal axis of an oxygen injector and the mixing element has been arranged along another longitudinal axis of an igniting means, with these two longitudinal axes being arranged at an angle relative to one another, making the entire injector apparatus known from the prior art and cited in the introductory part very large in configuration. More particularly, the igniting means, which comprises the mixing element, is flange connected laterally to the housing of the injector device by means of a hot gas port, giving the injector apparatus relatively large installation dimensions, which is considered a disadvantage.

Advantageously, the de Laval nozzle element and the mixing element in the present case are no longer spaced from one another by at least the hot gas port, which in the past has made injector apparatuses very large in configuration; in this case, the de Laval nozzle element and the mixing element instead are located one directly behind the other and are directly connected to one another.

The present injector device can be even more advantageously configured if the de Laval nozzle element and the mixing element are rotary components that are produced by machining and are connected to one another directly via a force-fitting and/or form-fitting connection. Configuring the de Laval nozzle element and the mixing element as rotary components makes it possible to produce an injector device that can be assembled and disassembled quickly.

The configuration of the present injector apparatus can be further simplified by positioning the de Laval nozzle element and the mixing element within and/or on the nozzle head part such that, between the nozzle head part and the de Laval nozzle element, an annular space into which a combustible gas channel and an air channel of the mixing element lead is produced. This enables a hot gas port separately flange-connected laterally to the injector device to be eliminated.

Advantageously, a first infeed channel of the mixing element is positioned in the mixing element in such a way that the infeed channel leads into the annular space axially in relation to the center longitudinal axis. A second infeed channel of the mixing element is preferably positioned in the mixing element such that said infeed channel leads into the annular space radially in relation to the center longitudinal axis. The infeed channels for feeding a combustible gas and air within a mixing element body can thereby be routed advantageously relative to one another, making the mixing element highly compact and small in structure.

To be able to secure the mixing element as specified in the invention on the nozzle head part in a structurally simple manner, it is advantageous for the mixing element to have a collar-type flange at its end that faces away from the de Laval nozzle element, by means of which flange the mixing element can be attached to the nozzle head part.

It is particularly expedient for the annular space to be adjustable based on the axial distance between the de Laval nozzle element and the mixing element. If at least areas of the cross-section of the annular space can be influenced based on the axial distance between de Laval nozzle element and mixing element, the injector apparatus can also be easily adapted to various processes to be carried out in a metallurgical unit or a melting vessel.

This axial distance can be adjusted in a structurally simple manner by adjusting the axial distance between the de Laval nozzle element and the mixing element by means of various annular spacer disks. For example, these spacer disks can be placed onto a projection of the de Laval nozzle element and supported against a shoulder of the de Laval nozzle element. This allows the mixing element to be positioned on or attached to the de Laval nozzle element with an installation path that is decreased by the thickness of the mounted annular spacer disk. A plurality of annular spacer disks may be provided if necessary.

The simple design of the injector device also allows the de Laval nozzle element in particular to be easily replaced. This is advantageous particularly because the de Laval nozzle element is a wearing part of the injector device.

It is further important to be able to replace the de Laval nozzle element easily so that different volumes of oxygen can be conducted to the injector device with little assembly effort. Heretofore, this has required that the entire injector device be replaced. In this present case, different de Laval nozzle elements can be replaced individually.

It goes without saying that the de Laval nozzle element and the mixing element can be connected to one another in different ways, for example by means of a quick-release connection or the like. Expediently, the de Laval nozzle element has an external thread by means of which the de Laval nozzle element can be screw-connected into an internal thread of the mixing element. This enables the de Laval nozzle element to be attached to the mixing element in an unambiguous manner, thereby preventing installation errors.

The external thread and the internal thread corresponding thereto can be known pipe threads, thereby enabling further production simplification.

The configuration of the injector apparatus can be further simplified by positioning the de Laval nozzle element and the mixing element concentrically within and/or on the nozzle head part.

It is therefore likewise advantageous for the de Laval nozzle element to be arranged centered around the center longitudinal axis by means of the mixing element.

In order for the high-velocity jet produced by the injector device to be delivered in a defined manner by the injector apparatus, the injector apparatus comprises the nozzle head part. The present injector apparatus can then be further simplified structurally by assigning the nozzle head part, in which at least the de Laval nozzle element for forming the annular space is located, to an injector mount, preferably embodied as an injector box made at least partially of copper.

It is advantageous in this regard for the injector apparatus to have an injector mount for supporting the injector device inside the metallurgical unit or melting vessel, with the injector mount comprising the nozzle head part.

If the nozzle head part is a structural component of the injector mount, the injector device, in particular the de Laval nozzle element, can be particularly easily replaced in the injector apparatus.

It is a particular advantage that this allows the nozzle head part on the injector device to be dispensed with entirely, since the nozzle head part is integrated into the injector mount or into the injector box thereof.

A generic injector apparatus can be advantageously enhanced solely by the features associated with the injector mount comprising the nozzle head part, therefore these features are advantageous even without the remaining features of the invention.

The present injector device can be further simplified and more compactly configured if the nozzle head part comprises a device for positioning at least one igniting means, the at least one igniting means being positioned on the nozzle head part such that the at least one igniting means projects into an annular space formed by the de Laval nozzle element and the nozzle head part. This allows commercially available spark plugs to be used for igniting the combustible gas/air mixture.

If the at least one igniting means is arranged perpendicular to the center longitudinal axis of the injector device on the nozzle head part, it can be arranged on the injector device in a structurally simple manner. In particular, the use of an additional ignition lance element or the like installed in the injector device from the rear of the injector apparatus can be dispensed with.

In general, more reliable ignition components can be used, therefore the present injector apparatus as a whole is designed to require less maintenance.

Since generic injector apparatuses can be advantageously enhanced solely by the features described in connection with the igniting means, these features are also advantageous even without the remaining features of the present invention.

A further advantageous variant, the features of which enhance generic injector apparatuses even without the remaining features of the invention, provides that the nozzle head part has a plurality of oxygen ducts having oxygen outlet openings to allow air or oxygen to be conducted from the exterior onto a hot gas jet produced from the ignited combustible gas/air mixture.

With the help of these oxygen ducts having the oxygen outlet openings, an additional envelope of air or oxygen surrounding the hot gas jet produced from the ignited combustible gas/air mixture can be produced, thereby further improving the combustion process of the combustible gas/air mixture.

The oxygen present in the air is sufficient for this purpose. Alternatively, however, pure oxygen may also be cumulatively or alternatively fed in.

These oxygen ducts preferably extend within the nozzle head part diagonally to the hot gas jet exiting the nozzle head part, so that the air jets flowing from said ducts meet the hot gas jet while it is still inside the nozzle head part and therefore also inside the injector mount or in the injector box thereof.

At least ambient air can be provided for this purpose in a particularly structurally simple manner if corresponding oxygen intake openings for the oxygen ducts are arranged around the periphery of the nozzle head part.

It is therefore advantageous for the oxygen ducts to be arranged within the nozzle head part concentrically to and angularly around the center longitudinal axis of the injector device. In other words, the oxygen ducts each form an angle with the center longitudinal axis.

If the oxygen outlet openings are located within an outlet opening of the nozzle head part, the hot gas jet can be stabilized particularly effectively in the manner of an air jet shroud by means of the air exiting from the oxygen outlet openings.

The air or the pure oxygen can advantageously be drawn through the oxygen ducts purely by the suction effect of the hot gas jet. This advantageously prevents the additional oxygen outlet openings from becoming clogged with slag or the like. Furthermore, this makes it unnecessary to provide additional control lines in the valve stand. An additional clearing medium can also be dispensed with, since cost-free ambient air can be used.

Of course the mixing element in particular, for example with its collar-type flange, can be mounted in various ways on the nozzle head part. For example, by means of a screw-mounted flange connection.

It is more advantageous for the nozzle head part to comprise a quick-release device to enable the de Laval nozzle element and/or the mixing element to be clamped in a form-fitting connection. This allows the de Laval nozzle element in particular to be replaced more quickly.

If the mixing element can be clamped to the nozzle head part in a form-fitting connection such that the de Laval nozzle element is detachably secured on the nozzle head part by means of the mixing element, the injector device can be removed exceptionally easily from the injector mount, but can also be very easily and quickly mounted on this injector mount so that the injector apparatus as a whole is ready again for use more quickly.

The injector device can be mounted or removed in an extremely advantageous manner if the nozzle head part quick-release device positioned laterally at an end of the nozzle head part that faces away from the outlet opening is configured such that three or more clamping means of the quick-release device are arranged concentrically around the center longitudinal axis of the injector device.

The quick-release device preferably comprises at least two or three clamping means distributed around the periphery of the nozzle head part, whereby the injector device can be reliably secured to the nozzle head part.

A perpetually tight mount can be ensured if the mixing element quick-release device comprises a compressible lateral ring element, in particular a Viton® O-ring.

Particularly if a fluid-based cooling device is provided on the injector apparatus, hose coupling elements that require additional detachment can be dispensed with if a correspondingly designed compressible ring element, in particular a Viton® O-ring, is provided.

This ring element can be replaced by a single person without an additional lifting mechanism or the like.

It should further be noted at this point that the features specified in connection with the quick-release device are likewise advantageous even without the remaining features of the present invention, since generic injector apparatuses can be advantageously enhanced by these features alone.

A preferred variant provides that an injector mount for supporting the injector device comprises an articulated unit by means of which the nozzle head part is arranged articulated on the injector mount. Frequently, in metallurgy it is desirable for the angle of the injector device to be adjustable in relation to a steel bath and/or in relation to graphite electrodes of an electric arc furnace. This can be achieved with the present articulated unit.

If the articulated unit has an articulated shield part and an articulated head part, with the articulated head part comprising the nozzle head part, the articulated unit can be integrated at low cost into the injector apparatus.

If the articulated head part is mounted on the articulated shield part by means of a retaining ring element such that the articulated head part can be replaced, this will enable the nozzle head part to be easily replaced on the injector mount or the injector box thereof.

The angle of the injector device or of the nozzle head part can preferably be adjusted by means of the articulated unit within an angular adjustment range of at least +/−6°.

Advantageously, heat can be regulated particularly on the articulated head part via a contact surface formed with the articulated shield part. Thermal conductivity can also be further improved by using an appropriate thermal compound.

A generic injector apparatus can advantageously be further enhanced by the features of the articulated unit, therefore these features are also advantageous even without the remaining features of the invention.

As an alternative, the nozzle head part may be located permanently on an injector mount for supporting the injector device. The nozzle head part is thereby permanently integrated into the injector mount.

It is advantageous in this case for the nozzle head part to be integrally connected to the injector mount.

It is further advantageous for the injector apparatus to comprise a cooling device that operates by conduction, in which case the nozzle head part comprises a metallic cooling contact surface which is in direct functional contact with a metallic cooling contact surface of the injector mount.

It is advantageous in this case for the nozzle head part to comprise a metallic cooling contact surface which is in conductive functional contact with a corresponding metallic cooling contact surface of the injector mount, so that a transfer of heat ideally from the nozzle head part to the injector mount can be achieved solely via conduction.

Cumulatively or alternatively, the nozzle head part can at least partially form wall regions of a coolant channel of a coolant device in an injector mount for supporting the injector device, whereby cooling can be additionally supported or carried out entirely by convection.

Thus for cooling the injector device, a metallic contact surface can be used, which is a component of a water-cooled injector box of the injector mount.

Advantageously, the injector device itself does not have any cooling water channels, thereby decreasing the risk that water will escape.

It is further advantageous for the injector device to be cooled by internal media, such as compressed air, oxygen and/or natural gas.

The injector device is preferably equipped with cooling fins to further improve the discharge of heat to the surrounding environment. At the same time, this produces a preheating of combustion air, which can improve the degree of efficiency of the pilot mode.

In addition, in the pilot mode combustion no longer heats the entire injector device, but only the de Laval nozzle element. However, this heat can be readily diverted to the rear part in which a suitably equipped media infeed device is located. All the other areas of the injector device ideally remain cooler.

A generic injector apparatus can be advantageously enhanced solely by the features associated with the cooling of the injector mount, therefore these features are advantageous without the remaining features of the invention.

The structural design particularly of the present injector device can be further improved if the injector apparatus has a media infeed device which is flange-connected to the mixing element, wherein the media infeed device comprises at least an outer tube, a center tube and an inner tube, wherein the inner tube is arranged at least partially in the center tube such that an annular combustible gas line is formed between the inner tube and the center tube, wherein the center tube is arranged at least partially in the outer tube such that an annular air or combustible gas line is formed between the center tube and the outer tube, and wherein the outer tube, the center tube and the inner tube are arranged concentrically around the center longitudinal axis of the injector device.

It is further advantageous for the annular combustible gas line and the annular air or combustible gas line to be arranged concentrically around the center longitudinal axis of the injector device.

With a media infeed device of this configuration, the injector device can be assembled and produced substantially from a plurality of rotary parts, thereby simplifying the production of the injector apparatus as a whole. In particular, a cumbersome alignment of individual components on a boring mill or the like, which is frequently necessary, is eliminated.

In addition, in the present case there are significantly fewer steel/copper welded joints, thereby decreasing the cost of assembly significantly.

A further preferred variant provides that a carbon lance element is provided inside the inner tube and extends through the mixing element into the de Laval nozzle element.

Particularly for producing a foam slag layer, it is advantageous for a carbon injector to be situated as close as possible to the injector device. This can be achieved very easily if a carbon lance element is located inside the inner tube.

A carbon injector thus integrated into the present injector device also offers the advantage that an additional mount for an external carbon injector is not necessary.

The oxygen gas jet exiting from an annular de Laval nozzle element outlet generates a suction effect at the outlet of the carbon lance element, whereby in practical terms the carbon is suctioned into an electric arc furnace, for example. This also serves to make clogged conducting lines etc. less likely.

In addition, when the injector device is in pilot mode, the outlet of the carbon lance element is automatically kept free of slag, etc. Thus an additional clearing means is not necessary.

It is further advantageous for the carbon lance element to comprise a ceramic tube. A ceramic tube when used on the present injector apparatus is not consumable and therefore does not need to be replaced, making the injector apparatus easier to maintain.

The features associated with the carbon lance element themselves further enhance a conventional injector apparatus, therefore these features are also advantageous even without the remaining features of the invention.

The object of the invention is also attained by an electric arc furnace that is equipped with at least one injector apparatus according to any one of the features described herein. The readiness for use of an electric arc furnace can be more reliably ensured if the electric arc furnace is equipped with the present injector apparatus.

Additional advantages, objectives and characteristics of the present invention will be specified in greater detail in reference to the appended set of drawings and the following description, in which, by way of example, an injector apparatus having a mixing element disposed directly behind a de Laval nozzle element along a center longitudinal axis of an injector device is illustrated and described.

Components in the individual figures that coincide at least substantially in terms of their function can be identified herein by the same reference signs, and the components need not be identified and described in each of the figures.

Figure 2:
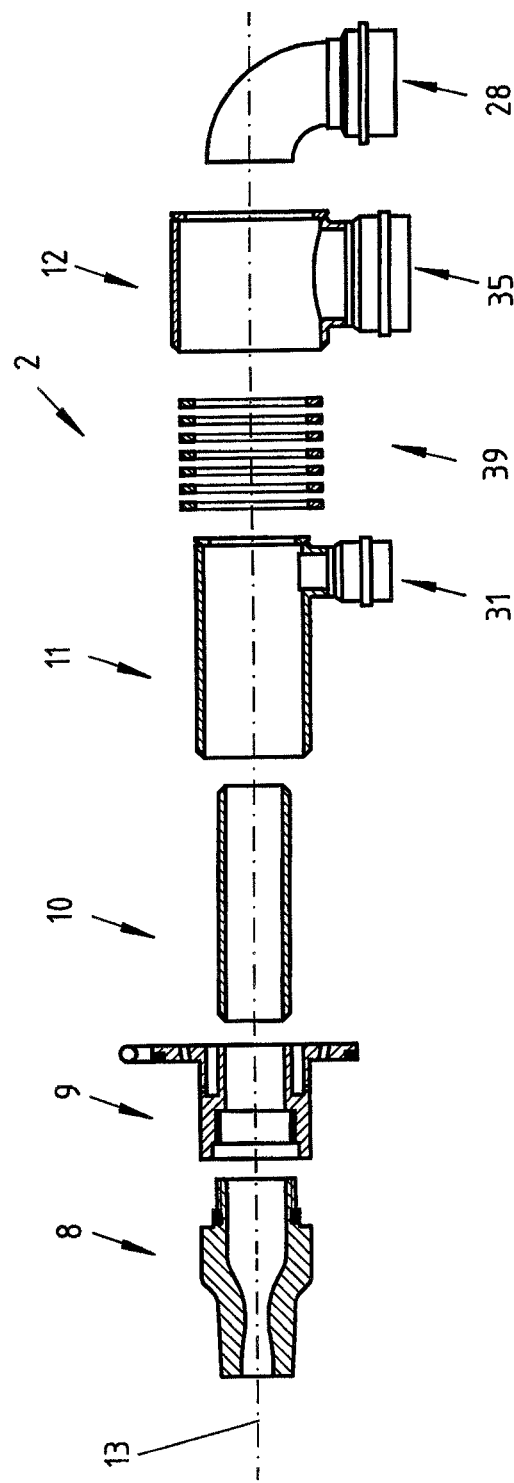
Figure 5:
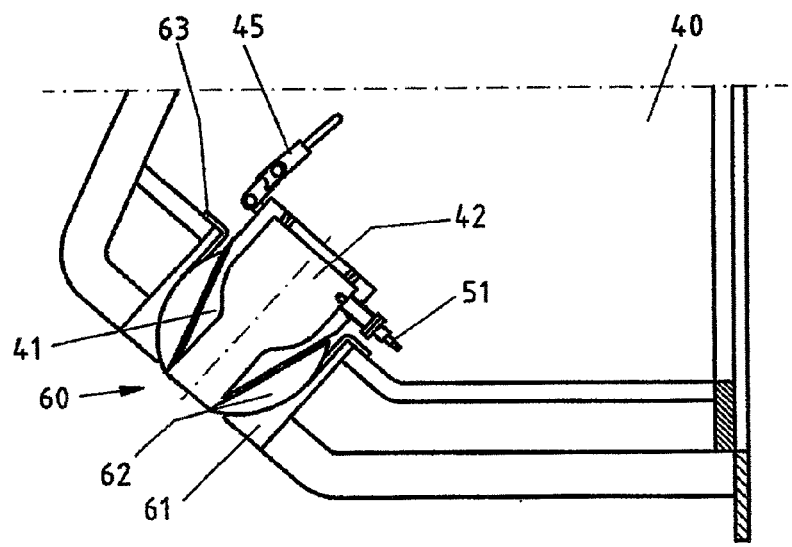
Figure 6:
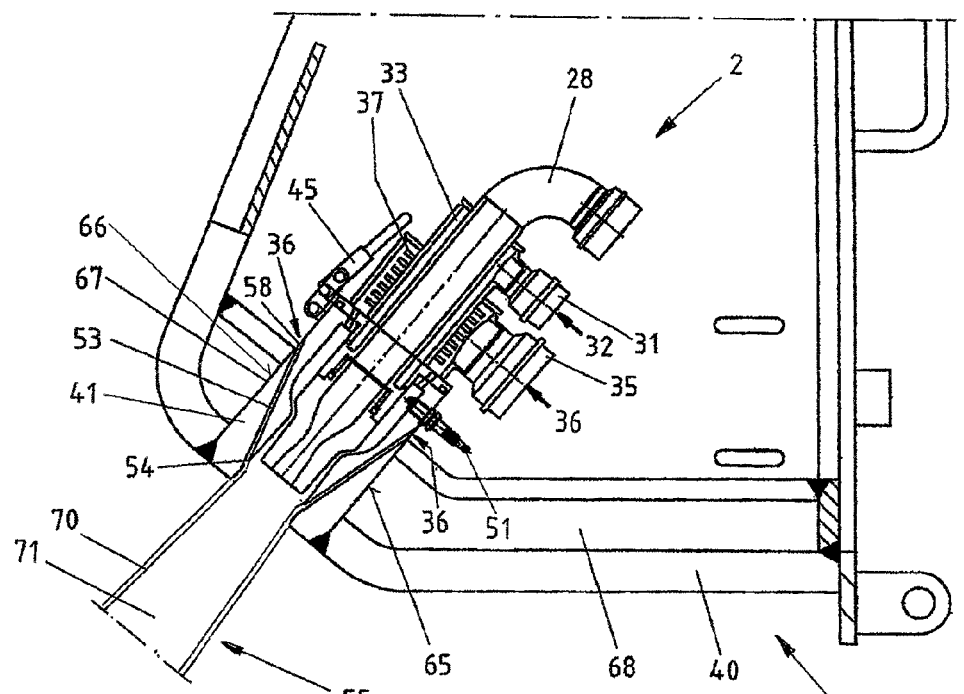
Figure 11:
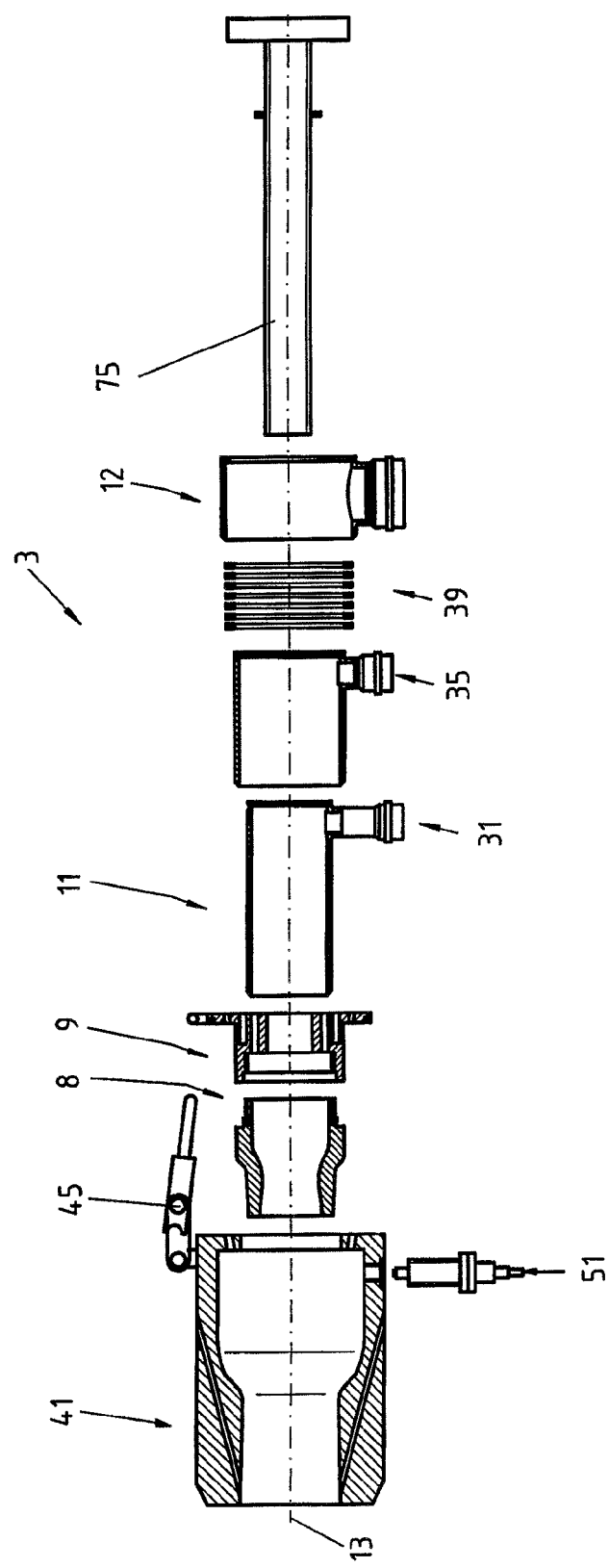

The drawings show:

FIG. 1 a schematic, partially sectional view of an injector device of an injector apparatus, having a de Laval nozzle element and a mixing element arranged one behind the other along a center longitudinal axis of an injector device;

FIG. 2 a schematic, exploded view of the injector device shown in FIG. 1;

FIG. 3 a schematic, detailed view of a nozzle head part of the injector apparatus with de Laval nozzle element and mixing element disposed along the center longitudinal axis;

FIG. 4 a further schematic, detailed view of the nozzle head part of FIG. 3 with de Laval nozzle element and mixing element attached to nozzle head part 41;

FIG. 5 a schematic view of an articulated unit integrated into the injector mount for the articulated mounting of the injector device on the injector mount;

FIG. 6 a schematic view of the injector apparatus in a pilot mode;

FIG. 7 a schematic view of the injector apparatus in a burner mode;

FIG. 8 a schematic view of the injector apparatus in a lance mode;

FIG. 9 a schematic view of an alternative injector device having a carbon lance element;

FIG. 10 a schematic view of the alternative injector device shown in FIG. 9 in a combined oxygen-carbon mode; and FIG. 11 a schematic, exploded view of the alternative injector device shown in FIGS. 9 and 10.

Injector apparatus 1, shown in part by way of example in FIGS. 1 to 11 (see especially FIGS. 6 to 8 and 10), can be equipped with injector devices 2 (cf. FIG. 1 to 8) or 3 (cf. FIGS. 9 to 11) of various configurations.

Injector apparatus 1 in this embodiment example is used for blowing oxygen-rich gases and/or carbon onto or into an electric arc furnace 4, which is known and therefore will not be shown and described here in any greater detail.

Injector device 2 or 3 in each case serves to produce a high-velocity gas jet 5 (see FIGS. 6, 7, 8 and 10), for example from an oxygen gas jet 6 and an ignited combustible gas/air mixture jet 7.

As is also readily apparent particularly from the diagram of FIG. 2, injector device 2 is composed in a structurally simple manner essentially of a de Laval nozzle element 8, a mixing element 9, an inner tube part 10, a center tube part 11 and an outer tube part 12.

It should be noted that all the aforementioned components 8 to 12 are arranged jointly along a center longitudinal axis 13 and coaxially to the center longitudinal axis 13 of injector device 2.

In particular, de Laval nozzle element 8 and mixing element 9 are arranged jointly along center longitudinal axis 13 of injector device 2 directly one behind the other such that when injector device 2 is in the assembled state, mixing element 9 is attached directly to de Laval nozzle element 8, as is clear particularly from the diagram of FIG. 1.

In this embodiment example, mixing element 9 is screwed onto de Laval nozzle element 8. For this purpose, de Laval nozzle element 8 is equipped with an external thread 14 and mixing element 9 is equipped with a corresponding internal thread 15.

In addition, between external thread 14 and a stop 17 for mixing element 9, formed by a shoulder 16 of de Laval nozzle element 8, a circumferential groove 18 for receiving an O-ring 19 is provided, by means of which interface region 20 between de Laval nozzle element 8 and mixing element 9 is tightly sealed.

Mixing element 9 has a collar-type flange 21 in which a groove 22 for receiving a compressible ring element 23, in particular a Viton® O-ring 24, is positioned.

A media infeed device 26, comprising substantially inner tube part 10, center tube part 11 and outer tube part 12, is flange-connected to the back side 25 of this collar-type flange 21.

At rear end 27 of inner tube part 10, an oxygen connector 28 is attached, through which oxygen 29 (cf. FIGS. 7 and 8) can be conducted into inner tube part 10, into mixing element 9 and ultimately into de Laval nozzle element 8. The oxygen 29 conducted in this manner into de Laval nozzle element 8 is accelerated in a known manner by de Laval nozzle element 8 and exits from outlet opening 30 of de Laval nozzle element 8 as oxygen gas jet 6 (cf. FIGS. 7 and 8).

Laterally on center tube part 11, a combustible gas connector 31 is provided, by means of which combustible gas 32, generally natural gas (cf. FIGS. 6 and 7), can be fed to injector device 2. For this purpose, center tube part 11 and inner tube part 10 are arranged relative to one another in such a way that an annular combustible gas line 33 is formed therebetween. Combustible gas 32 travels through this annular combustible gas line 33 into a combustible gas channel 34 of mixing element 9 that extends substantially axially within mixing element 9.

Likewise laterally on outer tube part 12, an air or combustible gas connector 35 is provided, by means of which air 36 (cf. FIGS. 6 and 8) or alternatively combustible gas 32, generally natural gas (cf. FIG. 7), can be fed to injector device 2, depending on which mode injector device 2 is in, as will be described in further detail below. For this purpose, center tube part 11 and outer tube part 12 are arranged relative to one another such that an annular air or combustible gas line 37 is formed therebetween. Air 36 or combustible gas 32 travels through this annular air or combustible gas line 37 into an air channel 38 of mixing element 9, which extends substantially axially within mixing element 9.

Also provided on media infeed device 26, on the exterior of center tube part 11, are cooling fins 39, via which heat can be transferred from injector device 2 to the medium (air 36 or combustible gas 32) located within annular air or combustible gas line 37, thereby allowing this medium to be supplied appropriately preheated.

Injector device 2, which is compact and very small in configuration, can be supported in a structurally simple manner on an injector mount 40 within electric arc furnace 4 by inserting de Laval nozzle element 8, which is screwed onto mixing element 9, into a nozzle head part 41 assigned to injector mount 40 and then using collar-type flange 21 of mixing element 9 to secure the de Laval nozzle element in nozzle head part 41 (see FIGS. 5 to 8, 10 and 11).

De Laval nozzle element 8 and part of mixing element 9 attached thereto can be inserted into nozzle head part 41, shown in greater detail particularly in FIGS. 3 and 4, through a mounting opening 42 such that an annular space 43, into which combustible gas channel 34 and an air channel 38 of mixing element 9 lead, is created between nozzle head part 41 and particularly de Laval nozzle element 8.

The cross-section of annular space 43 can be adjusted at least in areas by positioning annular spacer disks 44 of different thicknesses as needed between stop 17 of de Laval nozzle element 8 and mixing element 9, allowing the distance between de Laval nozzle element 8 and mixing element 9 to be variously selected.

To enable injector device 2 to be attached to nozzle head part 41 more quickly, the latter has a quick-release device 45 for clamping de Laval nozzle element 8 and/or mixing element 9 to nozzle head part 41 in a form-fitting connection.

Nozzle head part 41 further comprises a device 50 for positioning at least one igniting means 51 in the form of a commercially available spark plug 52. The at least one igniting means 51 is disposed on nozzle head part 41 such that it projects into the annular space 43 formed by de Laval nozzle element 8 and nozzle head part 41, to ignite the combustible gas/air mixture 7 contained therein.

To improve the combustion of combustible gas/air mixture jet 7, a plurality of oxygen ducts 53 (identified here by way of example) having oxygen outlet openings 54 are provided in nozzle head part 41, to allow air 36 to be conducted from the exterior onto a hot gas jet 55 produced from ignited combustible gas/air mixture 7 (cf. FIGS. 6 to 8 and 10), which flows out of an outlet opening 56 of nozzle head part 41.

To enable ambient air in particular to be suctioned in via oxygen ducts 53, corresponding oxygen intake openings 58 are arranged on lateral surface 57 of nozzle head part 41.

A secure connection between nozzle head part 41 and injector device 40 can be achieved when nozzle head part 41 is secured in a force-fitting connection, for example by welding, and therefore permanently on injector device 40 (cf. FIGS. 6 to 8 and 10).

Alternatively, nozzle head part 41 may also be secured in an articulated manner on injector mount 40, as is shown by way of example in the diagram of FIG. 5. For this purpose, injector mount 40 comprises an articulated unit 60 by means of which nozzle head part 41 can be articulated onto injector mount 40. On injector mount 40, an articulated shield part 61 is formed, and nozzle head part 41 is embodied as an articulated head part 62, which is movably nestled in articulated shield part 61. Articulated head part 62 can be secured in relation to articulated shield part 61 by means of a retaining ring element 63, which can be screwed into articulated shield part 61 as soon as a desired angle of injector device 2 has been set.

The cooling of injector device 2 can be sufficiently ensured by providing injector device 1 with a conductively operating cooling device, in which nozzle head part 41 comprises a metallic cooling contact surface 65 (identified here merely by way of example), which is in direct functional contact with a metallic cooling contact surface 66 of injector mount 40.

In the embodiment example shown here, nozzle head part 41 at least partially forms wall regions 67 (identified here merely by way of example) of a coolant channel 68 of a coolant device of injector mount 40.

Injector device 2 itself advantageously has no coolant channels, enabling injector device 2 to be mounted on injector mount 40 and removed therefrom very easily.

According to the diagram of FIG. 6 injector device 2 is in a pilot mode, in which hot gas jet 55 is composed only of a combustible gas flame 71 of combustible gas 32 surrounded by an atmospheric oxygen shroud 70, for preventing injector device 2 from becoming clogged with slag. In this case, air 36 is fed to injector device 2 by means of air or combustible gas connector 35 and combustible gas 32 in the form of natural gas is fed to the injector device by means of combustible gas connector 31.

According to the diagram of FIG. 7, injector device 2 is in a burner mode, in which hot gas jet 55 is composed of oxygen gas jet 6, a combustible gas jet 72 composed of combustible gas 32, and atmospheric oxygen shroud 70, specifically for enabling scrap metal that is filled into electric arc furnace 4 to be melted more quickly. In this case, combustible gas 32 in the form of natural gas is fed to injector device 2 by means of air or combustible gas connector 35 and oxygen 29 is fed to the injector device by means of oxygen connector 28.

According to the diagram of FIG. 8, injector device 2 is in a lance mode, in which hot gas jet 55 is composed of oxygen gas jet 6, combustible gas/air mixture jet 7, and atmospheric oxygen shroud 70, specifically for enabling oxygen to be introduced into molten metal located in electric arc furnace 4. In this case, air 36 is fed to injector device 2 by means of air or combustible gas connector 35, combustible gas 32 in the form of natural gas is fed to the injector device by means of combustible gas connector 31, and oxygen 29 is fed to the injector device by means of oxygen connector 28. Hot gas jet 55 in this case is in the form of high-velocity gas jet 5.

An alternative injector device 3 is shown in FIGS. 9 to 11, and in the following, only those features by which this second embodiment example differs from the first embodiment example will be specified.

Alternative injector device 3 has substantially the same structure as injector device 2 described above. However, alternative injector device 3 is also characterized by a carbon lance element 75 located within inner tube 10 and extending through mixing element 9 into de Laval nozzle element 8, for the purpose of introducing carbon 76 into electric arc furnace 4. This advantageously allows an additional carbon injector device to be dispensed with. Since carbon lance element 75 comprises a ceramic tube 77, it is particularly robust.

According to the diagram of FIG. 10, alternative injector device 3 is in a combined oxygen-carbon mode, in which hot gas jet 55 is composed of carbon 76, annular oxygen gas jet 6, combustible gas/air mixture jet 7 and atmospheric oxygen shroud 70, specifically for the purpose of introducing oxygen and carbon into molten metal located in electric arc furnace 4. In this case, air 36 is fed to alternative injector device 3 by means of air or combustible gas connector 35, combustible gas 32 in the form of natural gas is fed to the injector device by means of combustible gas connector 31, and oxygen 29 is fed to the injector device by means of oxygen connector 28. In addition, carbon 76 is also fed to alternative injector device 3 by means of carbon lance element 75.

At this point it should be explicitly mentioned that the features of the solutions described above or in the claims and/or figures may optionally also be combined so as to cumulatively implement or achieve the described features, effects and advantages accordingly.

It goes without saying that the above-described embodiment examples are merely initial configurations of the injector apparatus according to the invention. The configuration of the invention is not limited to these embodiment examples.

All of the features disclosed in the application documents are claimed as essential to the invention provided they are novel individually or in combination over the prior art.

LIST OF REFERENCE NUMERALS 1 injector apparatus
2 injector device
3 alternative injector device
4 electric arc furnace
5 high-velocity gas jet
6 oxygen gas jet
7 combustible gas/air mixture jet or combustible gas/air mixture
8 de Laval nozzle element
9 mixing element
10 inner tube part
11 center tube part
12 outer tube part
13 center longitudinal axis
14 external thread
15 internal thread
16 shoulder
17 stop
18 circumferential groove
19 O-ring
20 interface region
21 collar-type flange
22 groove
23 compressible ring element
24 Viton® O-ring
25 back side
26 media infeed device
27 rear end
28 oxygen connector
29 oxygen
30 outlet opening
31 combustible gas connector
32 combustible gas
33 annular combustible gas line
34 combustible gas channel
35 air or combustible gas connector
36 air
37 annular air or combustible gas line
38 air channel
39 cooling fins
40 injector mount
41 nozzle head part
42 mounting opening
43 annular space
44 annular spacer disks
45 quick-release device
50 positioning device
51 igniting means
52 spark plug
53 oxygen ducts
54 oxygen outlet openings
55 hot gas jet
56 outlet opening
57 lateral surface
58 oxygen intake openings
60 articulated unit
61 articulated shield part
62 articulated head part
63 retaining ring element
65 metallic cooling contact surface
66 metallic cooling contact surface
67 wall regions
68 coolant channel
70 atmospheric oxygen shroud
71 combustible gas flame
72 combustible gas jet
75 carbon lance element
76 carbon
77 ceramic tube

The invention claimed is:

1. An injector apparatus (1) for the pyrometallurgical treatment of metals, molten metals and/or slags in a metallurgical unit or melting vessel, said apparatus comprising an injector device (2, 3) for producing a high-velocity gas jet (5) from an oxygen gas jet (6) and an ignited combustible gas/air mixture jet (7), in which the injector device (2, 3) comprises a de Laval nozzle element (8) disposed in a nozzle head part (41) for producing the oxygen gas jet (6), and in which the combustible gas/air mixture (7) can be mixed by means of a mixing element (9) for mixing combustible gas (32) and air (36), characterized in that the de Laval nozzle element (8) and the mixing element (9) are arranged jointly within and/or on the nozzle head part (41) along the center longitudinal axis (13) of the injector device (2, 3), detachably from one another and one behind the other, so that between the nozzle head (41) and the de Laval nozzle element (8), an annular space (43) is formed into which a combustible gas channel (34) and an air channel (38) of the mixing element (9) open.

2. The injector apparatus (1) according to claim 1, characterized in that the de Laval nozzle element (8) and the mixing element (9) are rotary components produced by machining, which are connected directly to one another in a force-fitting and/or form-fitting manner.

3. The injector apparatus (1) according to claim 2, characterized in that the size of the annular space (43) can be adjusted based on the axial distance between the de Laval nozzle element (8) and the mixing element (9).

4. The injector apparatus (1) according to claim 3, characterized in that the axial distance between the de Laval nozzle element (8) and the mixing element (9) can be adjusted by means of various annular spacer disks (44).

5. The injector apparatus (1) according to claim 1, characterized in that the de Laval nozzle element (8) has an external thread (14) by means of which the de Laval nozzle element (8) can be screwed into an internal thread (15) of the mixing element (9).

6. The injector apparatus (1) according to claim 1, characterized in that the de Laval nozzle element (8) and the mixing element (9) are arranged concentrically within and/or on the nozzle head part (41).

7. The injector apparatus (1) according to claim 1, characterized in that the de Laval nozzle element (8) is arranged centered around the center longitudinal axis (13) of the injector device (2, 3) by means of the mixing element (9).

8. The injector apparatus (1) according claim 1, characterized in that the injector apparatus (1) has an injector mount (40) for supporting the injector device (2, 3) in the interior of the metallurgical unit or melting vessel, wherein the injector mount (40) comprises the nozzle head part (41).

9. The injector apparatus (1) according to claim 1, characterized in that the nozzle head part (41) comprises a positioning device (50) for at least one igniting means (51), wherein the at least one igniting means (51) is disposed on the nozzle head part (41) in such a way that the at least one igniting means (51) projects into an annular space (43) formed by the de Laval nozzle element (8) and the nozzle head part (41).

10. The injector apparatus (1) according to claim 9, characterized in that the at least one igniting means (51) is arranged perpendicular to the center longitudinal axis (13) of the injector device (2, 3) on the nozzle head part (41).

11. The injector apparatus (1) according to claim 1, characterized in that the nozzle head part (41) has a plurality of oxygen ducts (53) having oxygen outlet openings (54), to allow air (36) or oxygen from the exterior to be conducted onto a hot gas jet (55) produced from the ignited combustible gas/air mixture (7).

12. The injector apparatus (1) according to claim 11, characterized in that the oxygen ducts (53) are arranged within the nozzle head part (41) concentrically to and angularly around the center longitudinal axis (13) of the injector device (2, 3).

13. The injector apparatus (1) according to claim 11, characterized in that the oxygen outlet openings (54) are arranged within an outlet opening (56) of the nozzle head part (41).

14. The injector apparatus (1) according to claim 1, characterized in that the nozzle head part (41) comprises a quick-release device (45) for clamping the de Laval nozzle element (8) and/or the mixing element (9) in a form-fitting connection.

15. The injector apparatus (1) according to claim 14, characterized in that the mixing element (9) can be clamped in a form-fitting connection to the nozzle head part (41) in such a way that the de Laval nozzle element (8) is detachably secured on the nozzle head part (41) by means of the mixing element (9).

16. The injector apparatus (1) according to claim 14, characterized in that the nozzle head part (41) quick-release device (45) is embodied laterally at an end of the nozzle head part (41) that faces away from an outlet opening (56) such that three or more clamping means of the quick-release device (45) are arranged concentrically around the center longitudinal axis (13) of the injector device (2, 3).

17. The injector apparatus (1) according to claim 14, characterized in that the mixing element (9) quick-release device (45) comprises a lateral compressible ring element (23), in particular a Viton® O-ring (24).

18. The injector apparatus (1) according to claim 1, characterized in that an injector mount (40) for supporting the injector device (2, 3) comprises an articulated unit (60), by means of which the nozzle head part (41) is arranged articulated on the injector mount (40).

19. The injector apparatus (1) according to claim 18, characterized in that the articulated unit (60) has an articulated shield part (61) and an articulated head part (62), wherein the articulated head part (62) comprises the nozzle head part (41).

20. The injector apparatus (1) according to claim 18, characterized in that the articulated head part (62) can be removably secured to the articulated shield part (61) by means of a retaining ring element (63).

21. The injector apparatus (1) according to claim 1, characterized in that the nozzle head part (41) is permanently disposed on an injector mount (40) for supporting the injector device (2, 3).

22. The injector apparatus (1) according to claim 21, characterized in that the nozzle head part (41) is firmly bonded to the injector mount (40).

23. The injector apparatus (1) according to claim 1, characterized in that the injector apparatus (1) comprises a cooling device which operates by conduction, in which the nozzle head part (41) comprises a metallic cooling contact surface (65), which is in direct functional contact with a metallic cooling contact surface (66) of an injector mount (40) for supporting the injector device (2, 3).

24. The injector apparatus (1) according to claim 1, characterized in that the nozzle head part (41) at least partially forms wall regions (67) of a coolant channel (68) of a coolant device in the injector mount (40).

25. The injector apparatus (1) according to claim 1, characterized in that the injector apparatus (1) has a media infeed device (26) which is flange-connected to the mixing element (9), wherein the media infeed device (26) comprises at least an outer tube (12), a center tube (11) and an inner tube (10), wherein the inner tube (10) is arranged at least partially in the center tube (11) such that an annular combustible gas line (33) is formed between the inner tube (10) and the center tube (11), wherein the center tube (11) is arranged at least partially in the outer tube (12) such that an annular air or combustible gas line (37) is formed between the center tube (11) and the outer tube (12), and wherein the outer tube (12), the center tube (11) and the inner tube (10) are arranged concentrically around the center longitudinal axis (13) of the injector device (2, 3).

26. The injector apparatus (1) according to claim 25, characterized in that the annular combustible gas line (33) and the annular air or combustible gas line (37) are arranged concentrically around the center longitudinal axis (13) of the injector device (2, 3).

27. The injector apparatus (1) according to claim 25, characterized in that a carbon lance element (75) is provided inside the inner tube (10) and extends through the mixing element (9) into the de Laval nozzle element (8).

28. The injector apparatus (1) according to claim 27, characterized in that the carbon lance element (75) comprises a ceramic tube (77).

29. An electric arc furnace (4) comprising at least one injector apparatus (1) for pyrometallurgical treatment of metals, molten metals and/or slags in a metallurgical unit or melting vessel, said apparatus comprising an injector device (2, 3) for producing a high-velocity gas jet (5) from an oxygen gas jet (6) and an ignited combustible gas/air mixture jet (7), in which the injector device (2, 3) comprises a de Laval nozzle element (8) disposed in a nozzle head part (41) for producing the oxygen gas jet (6), and in which the combustible gas/air mixture (7) can be mixed by means of a mixing element (9) for mixing combustible gas (32) and air (36), characterized in that the de Laval nozzle element (8) and the mixing element (9) are arranged jointly within and/or on the nozzle head part (41) along the center longitudinal axis (13) of the injector device (2, 3), detachably from one another and one behind the other, such so that they can be detached from one another between the nozzle head (41) and the de Laval nozzle element (8), an annular space (43) is formed into which a combustible gas channel (34) and an air channel (38) of the mixing element (9) open.

\* \* \* \* \*